United States Patent [19]

Antonov

[11] Patent Number: 5,745,188
[45] Date of Patent: Apr. 28, 1998

[54] APPARATUS FOR SUPPRESSING INTERFERENCE IN TELEVISION VIDEO SIGNAL

[76] Inventor: Alexandr Alexandrovich Antonov, 164 Gor'kogo St., Apt. 59, Kiev 252006, Ukraine

[21] Appl. No.: 495,602
[22] PCT Filed: Jan. 14, 1994
[86] PCT No.: PCT/UA94/00002
   § 371 Date: Oct. 23, 1995
   § 102(e) Date: Oct. 23, 1995
[87] PCT Pub. No.: WO94/17621
   PCT Pub. Date: Aug. 4, 1994

[30] Foreign Application Priority Data

Jan. 15, 1993 [UA] Ukraine .................... 94010063

[51] Int. Cl.$^6$ .................................................. H04N 5/21
[52] U.S. Cl. ........................ 348/607; 348/618; 348/623
[58] Field of Search .................... 348/21, 606, 607, 348/616, 618, 619, 620, 621, 622, 623, 624, 501, 575; H04N 5/21, 5/208

[56] References Cited

U.S. PATENT DOCUMENTS

| | | | |
|---|---|---|---|
| 4,768,094 | 8/1988 | Ichinoi | 348/622 |
| 4,837,624 | 6/1989 | Heitmann et al. | 348/616 |
| 5,315,396 | 5/1994 | Miyadera | 348/616 |
| 5,543,926 | 8/1996 | Ezaki | 348/607 |

FOREIGN PATENT DOCUMENTS 1188904  10/1985  U.S.S.R. .................... H04N 5/14

*Primary Examiner*—John K. Peng
*Assistant Examiner*—Jeffrey S. Murrell
*Attorney, Agent, or Firm*—Abelman, Frayne & Schwab

[57] ABSTRACT

An apparatus for suppressing interference in a television video signal comprises series connected a high-pass filter (1), an electronic switch (2) and a low-pass filter (4), and a video signal front detector (3) having its input connected to the output of the low-pass filter (1), while the output thereof is connected to the control input of the electronic switch (2).

13 Claims, 15 Drawing Sheets

1

APPARATUS FOR SUPPRESSING INTERFERENCE IN TELEVISION VIDEO SIGNAL

TECHNICAL FIELD

The present invention relates to information science and, more particularly, to an apparatus for suppressing interference in television video signals.

BACKGROUND ART

Known in the prior art is a non-linear television picture sharpness corrector comprising a controlled time constant low-pass filter and connected in series to the control input thereof a rectifier and a fixed time constant low-pass filter, the input of the rectifier being connected to the signal input of the controlled time constant low-pass filter (SU, A, 1140269).

In this apparatus, however, any attempt to reduce a noise level in television pictures which are of practical interest and which contain, in addition to background, some pels, leads to marked sharpness impairment of edges (otherwise termed outline) of these pels.

Also known in the art is a television picture sharpness corrector comprising a fast time constant low-pass filter, a relatively longer time constant low-pass filter, three electronic switches connected in series to said filters, and an analyzer. The inputs of all the filters and of the analyzer are combined. Combined are also all the outputs of the electronic switches having their control inputs connected to three outputs of the analyzer (SU, A, 1188904).

In this apparatus, any attempt to reduce noise level in television pictures which are of practical interest and which contain pels having sharp edges (otherwise termed outline), leads to impairment of picture sharpness, and vice versa, any attempt to improve picture sharpness leads to an increase in picture noise level.

DISCLOSURE OF INVENTION

It is an object of the present invention to provide an apparatus for suppressing interference in a television video signal, which would permit considerable improvement in picture quality and, at the same time, in picture sharpness due to regeneration of the video signal.

This object is achieved by providing an apparatus for suppressing interference in a television video signal, the apparatus comprising connected in series an electronic switch and a low-pass filter, the apparatus according to the invention further comprising a high-pass filter having an input fed with a video signal, and an output connected to the signal input of the electronic switch, and a video signal front detector having an input connected to the output of the high-pass filter, while the output thereof being connected to the control input of the electronic switch.

In accordance with one aspect of the present invention, the video signal front detector comprises a full-wave rectifier connected in series with a squaring circuit.

In accordance with another aspect of the invention, the video signal front detector comprises a full-wave rectifier, a low-pass filter having an input connected to the output of the full-wave rectifier, an adder having inputs connected to the output of the full-wave rectifier and to the output of the low-pass filter, and a squaring circuit having an input connected to the output of the adder, the output of the squaring circuit being the output of the video signal front detector.

In accordance with yet another aspect of the invention, the apparatus comprises a signal delay unit having an input connected to the output of the high-pass filter, and an output connected to the signal input of the electronic switch.

In accordance with still another aspect of the invention, the video signal front detector includes two signal shaping channels having a common input which is the input of the video signal front detector, each channel comprising a squaring circuit in series with a monostable multivibrator, one of said channels comprising an inverter connected to the input of the squaring circuit, the outputs of the monostable multivibrators of channels being connected to the inputs of an AND circuit and of an OR circuit, the output of the AND circuit being connected to the input of another monostable multivibrator connected at its output to the input of a NOT circuit, the output of the OR circuit being connected to the input of a second signal delay unit coupled at its output to one input of a second AND circuit having the other input connected to the output of the NOT circuit, and the output of the AND circuit being the output of the video signal front detector.

In accordance with a further aspect of the invention, the video signal front detector includes two signal shaping channels, each channel comprising an adder, a squaring circuit and a monostable multivibrator, one of said channels comprising an inverter connected to one input of the adder, the second inputs of the adders in both channels being series connected to a full-wave rectifier and a low-pass filter, the inputs of both channels being combined and connected to the input of the full-wave rectifier, the input of the full-wave rectifier being the input of the detector, the outputs of the monostable multivibrators in both channels being connected to the inputs of an AND circuit and of an OR circuit, the output of the AND circuit being connected to the input of a further monostable multivibrator connected at its output to the input of a NOT circuit, the output of the OR circuit being connected to the input of a second signal delay unit connected at its output to one input of a second AND circuit having its another input connected to the output of the NOT circuit, and the output of the circuit being the output of the video signal front detector.

In accordance with yet another aspect of the invention, the apparatus comprises a first adder having a video signal input and the other output coupled to the output of a first low-pass filter, a second low-pass filter having an input connected to the output of the first adder, and a second adder, the inputs of the second adder being connected to the outputs of said first and second low-pass filters, and the output thereof being the output of the entire apparatus.

In accordance with a still further aspect of the invention, the apparatus comprises a first adder having a video signal input and the other input coupled to the output of a first low-pass filter, a first analog storage having its signal input fed with a video signal, and the control input connected to the output of a video signal front detector, a NOT circuit having an input connected to the output of the video signal front detector, an integrating circuit having its signal input connected to the output of the first adder and its zero adjustment input connected to the output of the video signal front detector, and a second analog storage having its signal input connected to the output of the first analog storage, its control input connected to the output of the NOT circuit and its output connected to one input of a second adder, the other input of the second adder being connected to the output of the integrating circuit, while the output thereof being the output of the entire apparatus.

In accordance with a yet further aspect of the invention, the apparatus comprises a first adder having a video signal input and the other input coupled to the output of a first low-pass filter, an analog storage having its signal input connected to the output of the first low-pass filter and its control input connected to the output of a video signal front detector, a second low-pass filter having an input connected to the output of the first adder, and a second adder, the inputs thereof being connected to the outputs of the second low-pass filter and of the analog storage, and the output of the second adder being the output of the entire apparatus.

In accordance with a still further aspect of the invention, the apparatus for suppressing interference in color television video signals comprises, for each color television video signal, a separate apparatus for suppressing interference in a respective video signal, the outputs of all corresponding video signal front detectors being connected to the inputs of an OR circuit having its output connected to the control inputs of all electronic switches and to the control inputs of all analog storages.

The apparatus for suppressing interference in a television video signal according to the invention provides for a significant increase in interference suppression while completely preventing reduction of a video signal front steepness. Furthermore, the apparatus of the invention permits, along with a significant increase in interference suppression, an increase in the front steepness of a video signal to substantially improve the quality of a television picture even when using video signals generated in low quality television devices such as video cameras, magnetic tape recorders and antennas.

BRIEF DESCRIPTION OF DRAWINGS

Further the present invention will become more apparent upon consideration of the following description of specific embodiments thereof when taken in conjunction with accompanying drawings, wherein.

BEST MODE FOR CARRYING OUT THE INVENTION

Figure 1:
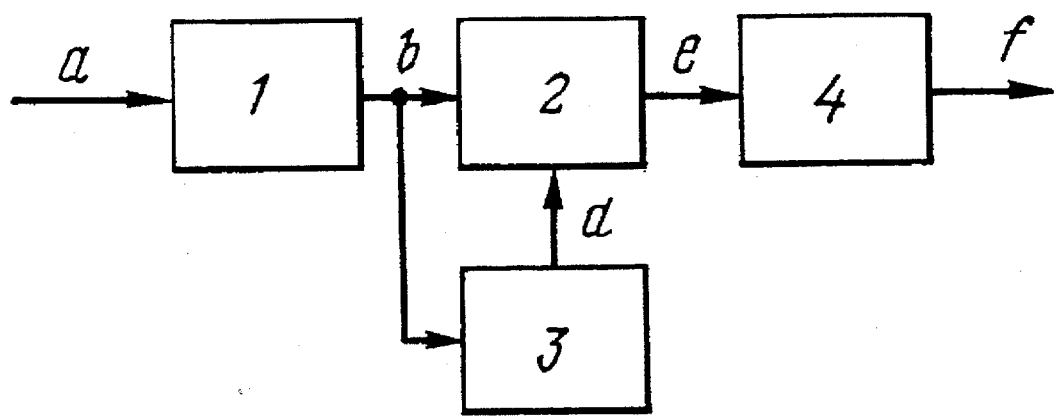
FIG. 1 is a functional block diagram of an apparatus for suppressing interference in monochrome television video signals.

Referring now to FIG. 1, there is shown a functional block diagram of an apparatus for suppressing interference in a monochrome television video signal, the apparatus comprising a high-pass filter 1 the input of which serves as the input of the apparatus, while the output thereof is connected to the signal input of an electronic switch 2. Connected to the control input of the electronic switch 2 is the output of a video signal front detector 3 having an input connected to the output of the high-pass filter 1. Connected to the output of the electronic switch 2 is a low-pass filter 4 having, in the image frequency band, a reverse frequency characteristic with respect to that of the high-pass filter 1. The output of the low-pass filter 4 is the output of the entire apparatus.

The video signal front detector 3 comprises a full-wave rectifier 5 (FIG. 2) connected in series with a squaring circuit 6 such as a comparator.

Figure 3:
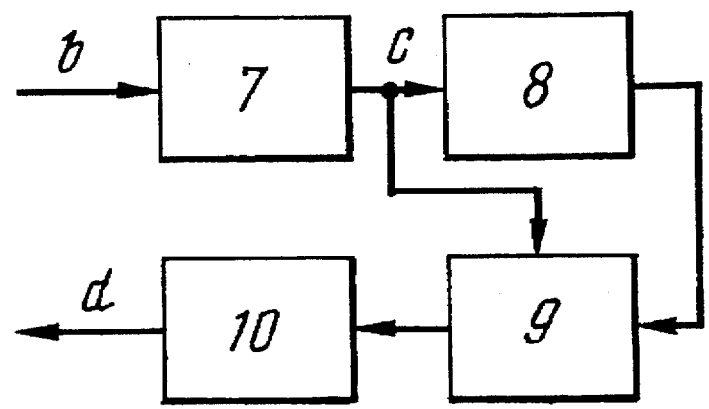
FIG. 3 is another functional block diagram of the video signal front detector.

In another arrangement, the video signal front detector 3 includes series connected a full-wave rectifier 7 (FIG. 3), a low-pass filter 8, an adder 9, and a squaring circuit 10 such as a comparator, the other input of the adder 9 being connected to the output of the full-wave rectifier 7.

Figure 4:
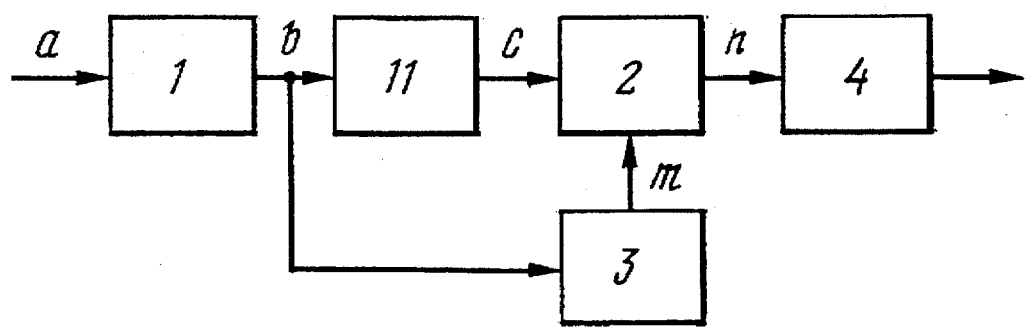
FIG. 4 is a functional block diagram of another arrangement of the apparatus.

In an arrangement for monochrome television represented in FIG. 4 by its functional block diagram, there is a signal delay unit 11 such as a delay line, having its output connected to the input of the electronic switch 2 and its input connected to the output of the high-pass filter 1.

Figure 5:
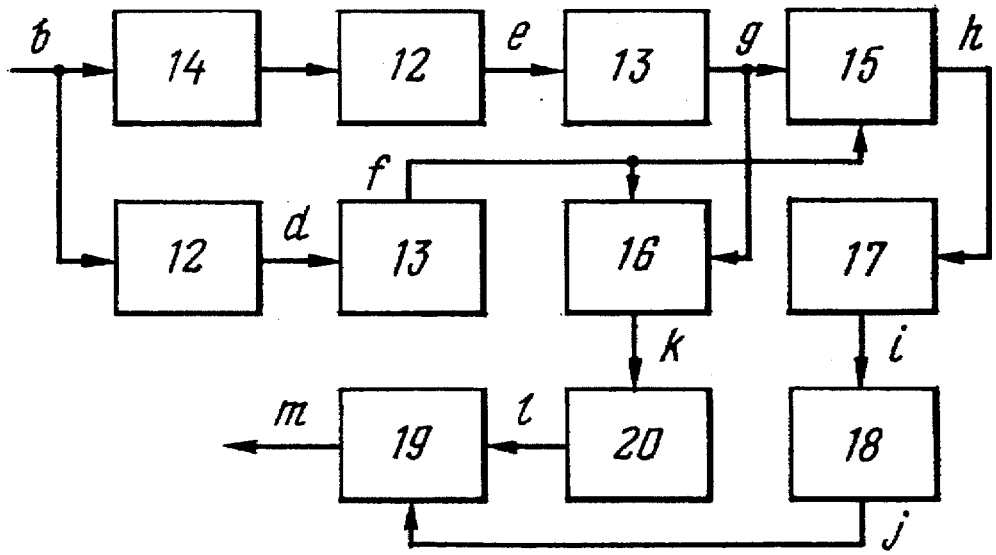
FIG. 5 is a functional block diagram of a video signal front detector included in the apparatus shown in FIG. 4.

The video signal front detector 3 may be constructed as shown in FIG. 5 and comprise two video signal processing channels each including a squring circuit 12 in series with monostable multivibrator 13. In one of these channels, connected to the input of the squaring circuit 12 is the output of au inverter 14. The inputs of the inverter 14 in one channel and the squaring circuit 12 in the other channel are combined and serve as the input of the entire detector. The outputs of the two monostable multivibrators 13 are connected to the inputs of an AND circuit 15 and OR circuit 16. The output of the AND circuit 15 is connected to a monostable multivibrator 17 having its output connected to a NOT circuit 18, the output of the NOT circuit 18 being connected to one input of another AND circuit 19 the other input of which is connected to the output of the OR circuit 16 through a signal delay unit 20.

The detector 3 (FIG. 4) may also comprise two signal processing channels, each including an adder 21 (FIG. 6), a squaring circuit 22, and a monostable multivibrator 23 connected in series. Connected to one input of the adder 21 of the first channel is the output of an inverter 24, while the input of the adder 21 of the second channel is combined with the input of the inverter 24, the latter input being the input of the detector 3 (FIG. 4).

The detector 3 also comprises a full-wave rectifier 25 (FIG. 6) in series with a low-pass filter 26. The input of the rectifier 25 is combined with the input of the inverter 24, while the output of the filter 26 is connected to the inputs of the adders 21 of the both channels. The outputs of the monostable multivibrators 23 of the both channels are connected to the outputs of an AND circuit 27 and OR circuit 28. The output of the AND circuit 27 is connected, through another monostable multivibrator 29 connected in series with a NOT circuit 30, to one input of another AND circuit 31 the other input of which is connected to the output of the OR circuit 28 through a signal delay unit 32.

In accordance with one arrangement of the apparatus for monochrome television, the output of the low-pass filter 4 is connected to one input of an adder 33 (FIG. 7) the other input of which is combined with the input of the high-pass filter 1. The output of the low-pass filter 4 is connected to the input of a further adder 34 the other input of which is connected to the output of the adder 33 through a low-pass filter 35, the output of the high-pass filter 1 being connected to the electronic switch 2 either directly or through the signal delay unit 11 (FIG. 8) which connects the output of the high-pass filter 1 with the signal input of the electronic switch 2.

According to another arrangement of the apparatus, the output of the adder 33 (FIG. 9) is connected to the signal input of an integrating circuit 36 having its zero adjustment input connected to the output of the detector 3. The signal input of an anolog storage 37 (also referred to as sample-and-hold unit) is combined with the input of the filter 1, while the control input of the storage 37 is connected to the output of the detector 3. The output of the analog storage 37 is connected to the signal input of another analog storage 38 having its control input connected to the output of a NOT circuit 39 which is connected to the output of the detector 3. The outputs of the integrating circuit 36 and of the analog storage 38 are connected to the inputs of the adder 34 whose output is the output of the apparatus of the invention.

Figure 7:
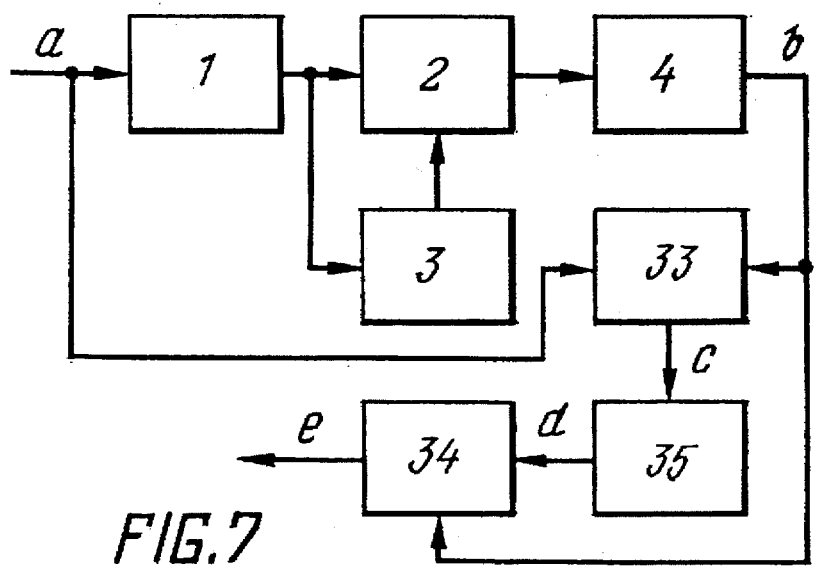
FIG. 7 is a functional block diagram of a third arrangement of the apparatus for suppressing interference in a video signal.
Figure 8:
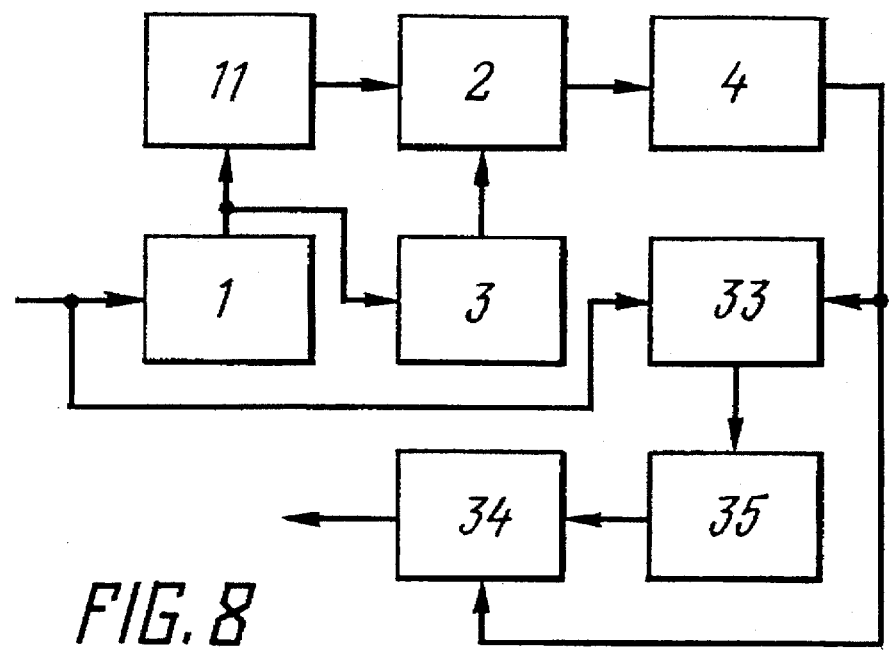
FIG. 8 is a functional block diagram of still another arrangement of the apparatus for suppressing interference in a video signal.

An analog storage 40 (FIGS. 10 and 11) may be included into the circuit of the interference suppressing apparatus shown in FIGS. 7 and 8, respectively. In this case, the analog storage 40 (FIGS. 10 and 11) has its inputs connected to the output of the low-pass filter 4 and to the output of the detector 3, while the output thereof is connected to the input of the adder 34.

Figure 12:
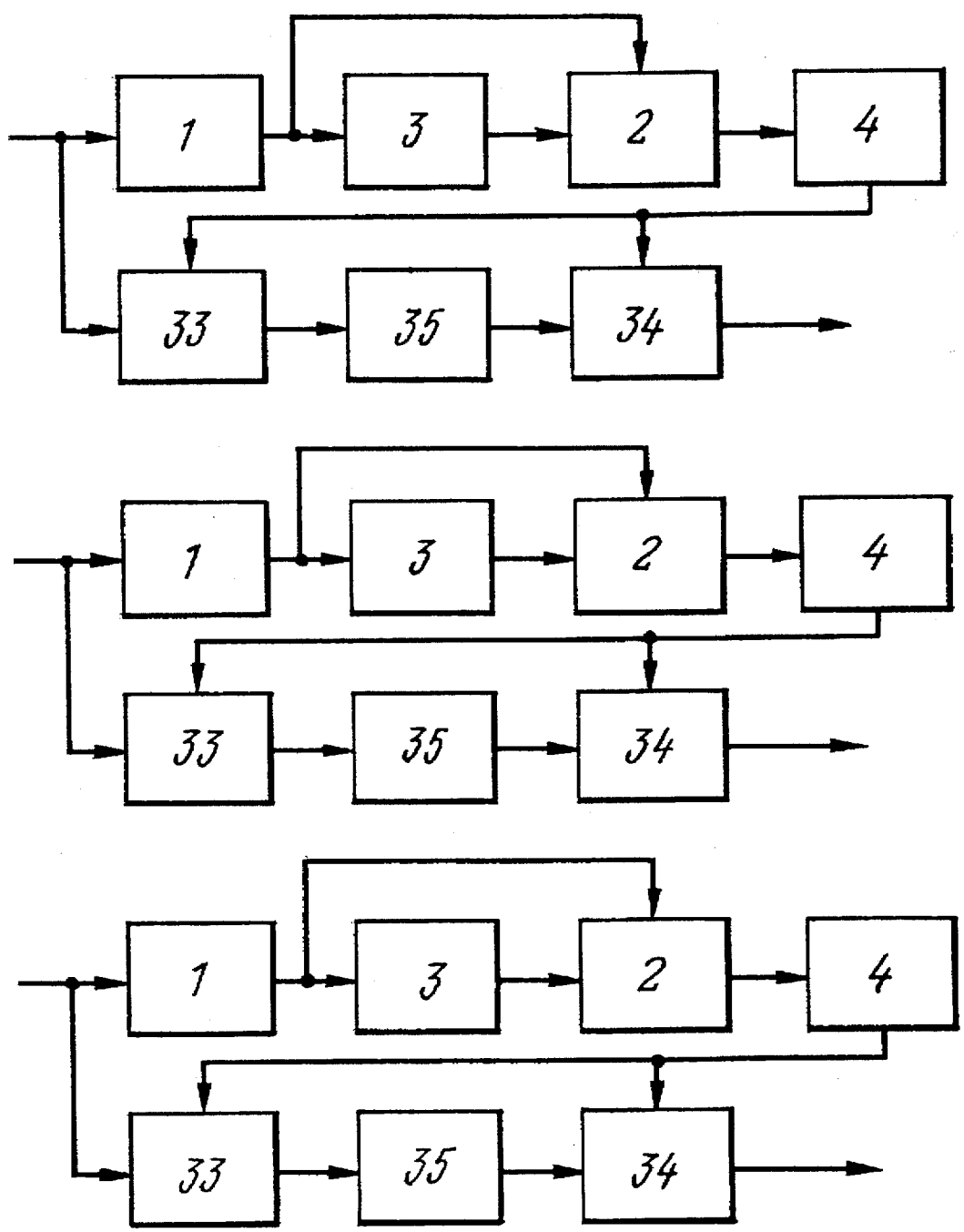
FIG. 12 is a functional block diagram of an arrangement of the apparatus for color television.

The apparatus for suppressing interference in a color television video signal represented in FIG. 12 by its functional block diagram includes three channels (according to the number of video signals), each being identical to an apparatus for suppressing interference in a monochrome television video signal shown as a functional block diagram, for example, in FIG. 7. In this case, however, the outputs of the detectors 3 of all these interference suppressing apparatus are connected to the inputs of an OR circuit 41 (FIG. 13), the output of the OR circuit 41 being connected to the control inputs of the electronic switches 2 of all the interference suppressing apparatus.

Figure 14:
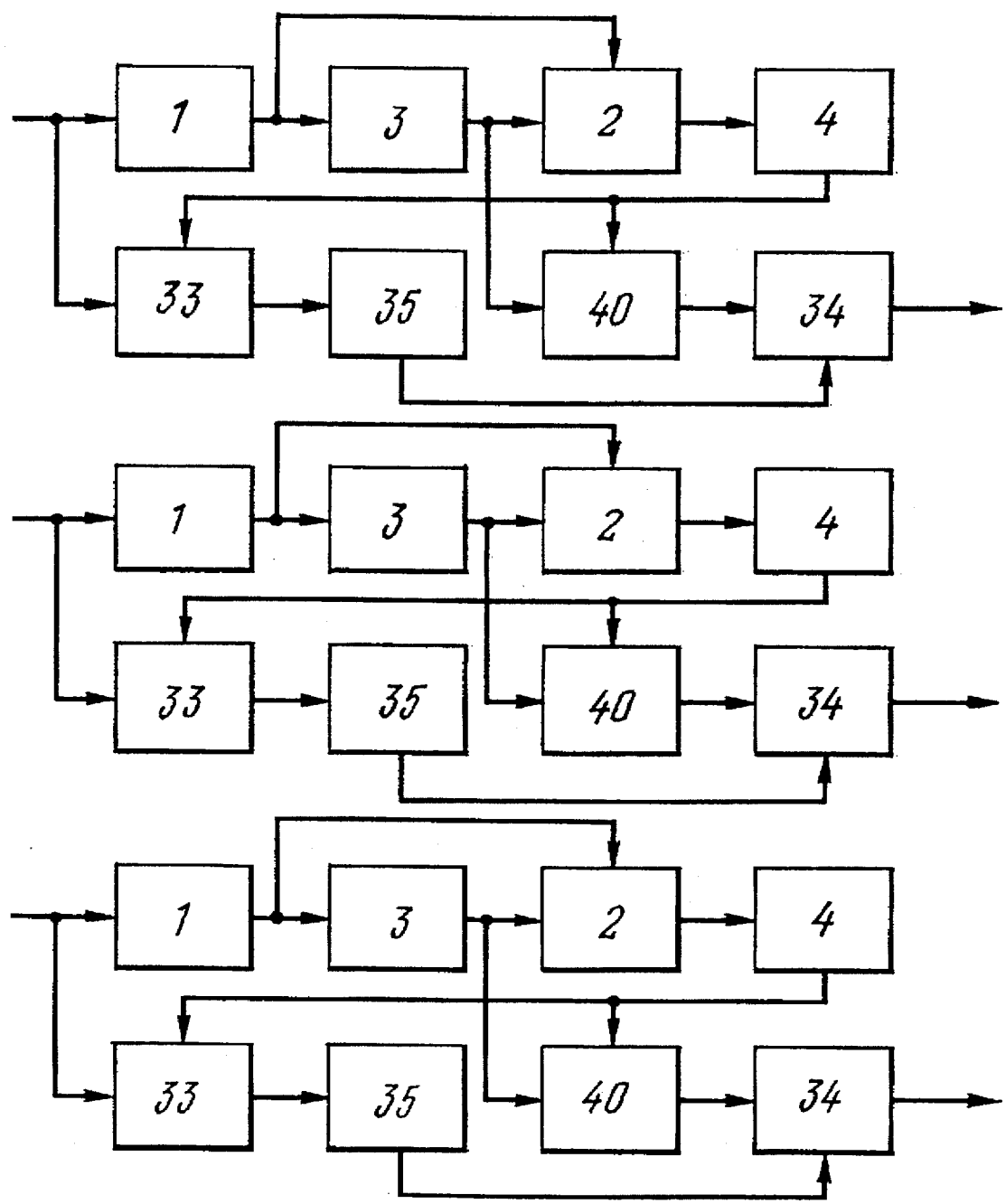
FIG. 14 is a functional block diagram of a third arrangement of the apparatus for color television.
Figure 15:
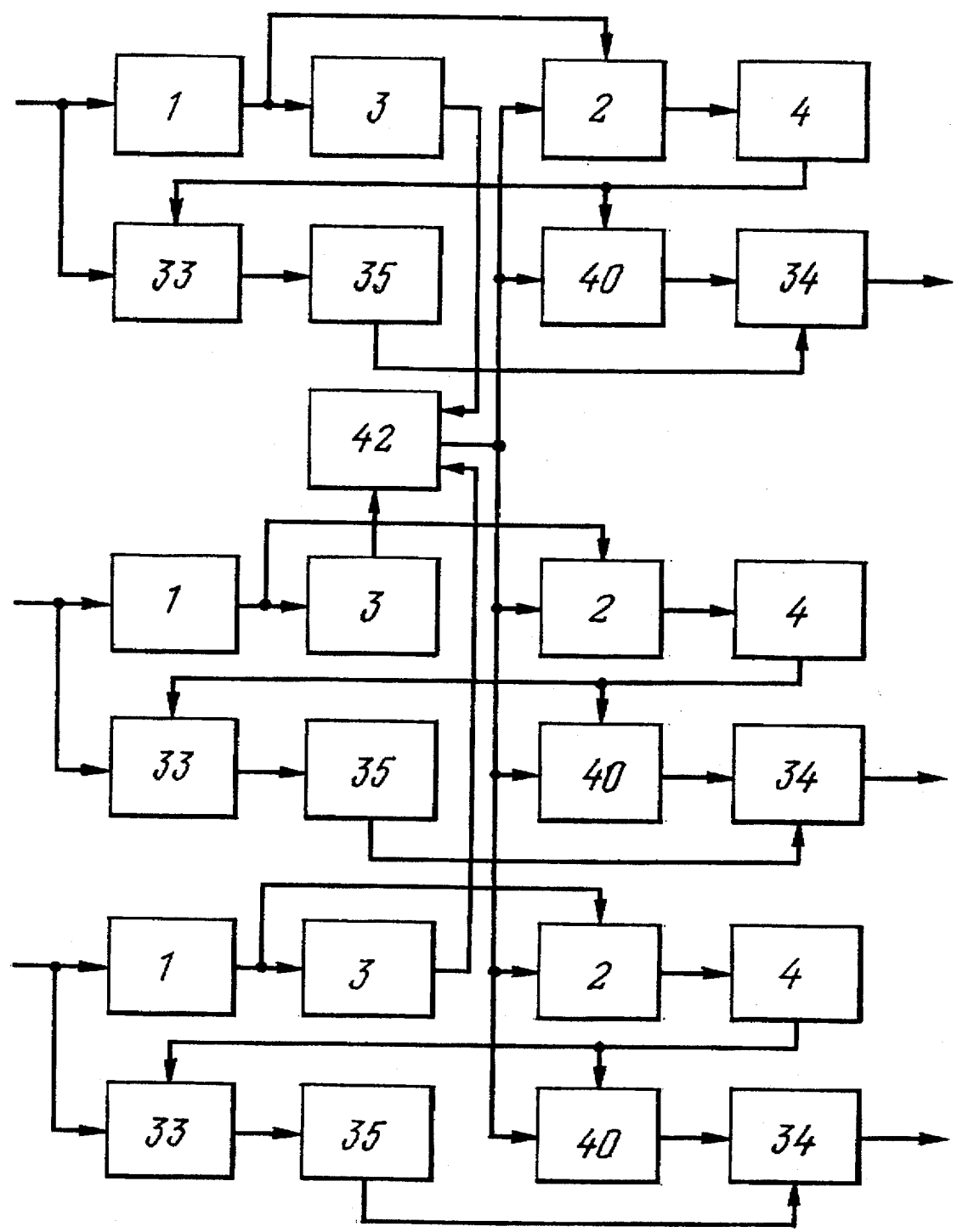
FIG. 15 is a functional block diagram of still another arrangement of the apparatus for color television.

In practice, all previously illustrated apparatus for monochrome television may be used to suppress interference in color television video signals. To explain this, FIGS. 14 and 15 show an apparatus for suppressing interference in color television video signals, using all the apparatus shown in FIG. 10, the apparatus of FIG. 15 comprising an OR circuit 42 having its inputs connected to the outputs of the detectors 3 of all the channels, while the output of the OR circuit 42 is connected to the control inputs of the electronic switches 2 and of the analog storages 40 in all video signal channels.

Figure 2:
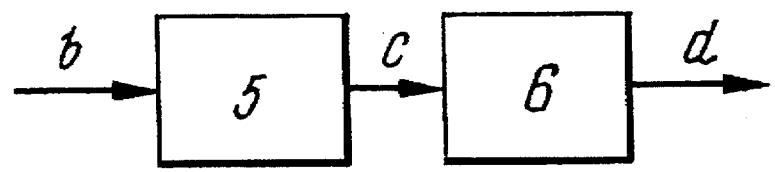
FIG. 2 is a functional block diagram of a video signal front detector included in the apparatus shown in FIG. 1.
Figure 10:
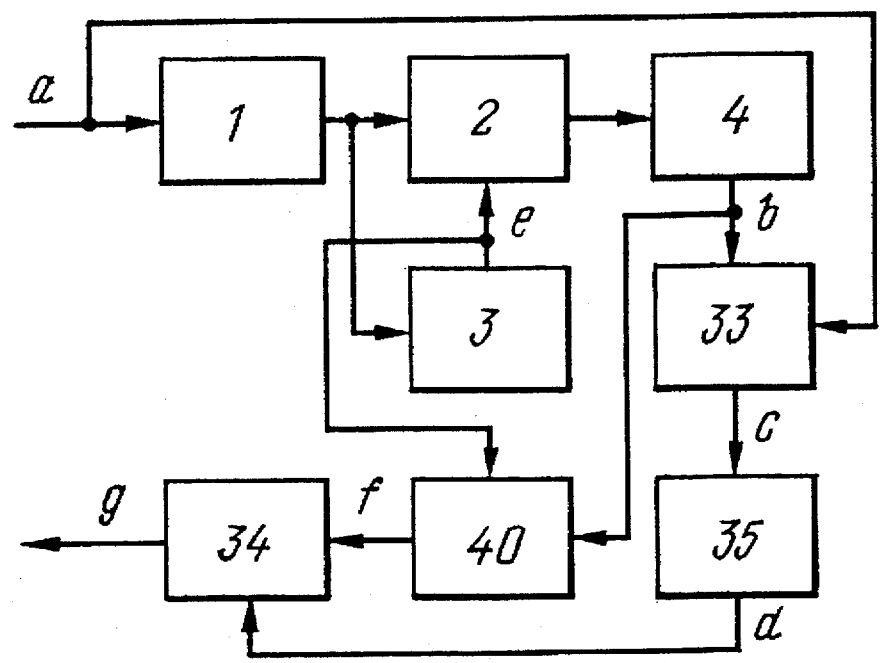
FIG. 10 is a functional block diagram of yet another arrangement of the apparatus.
Figure 11:
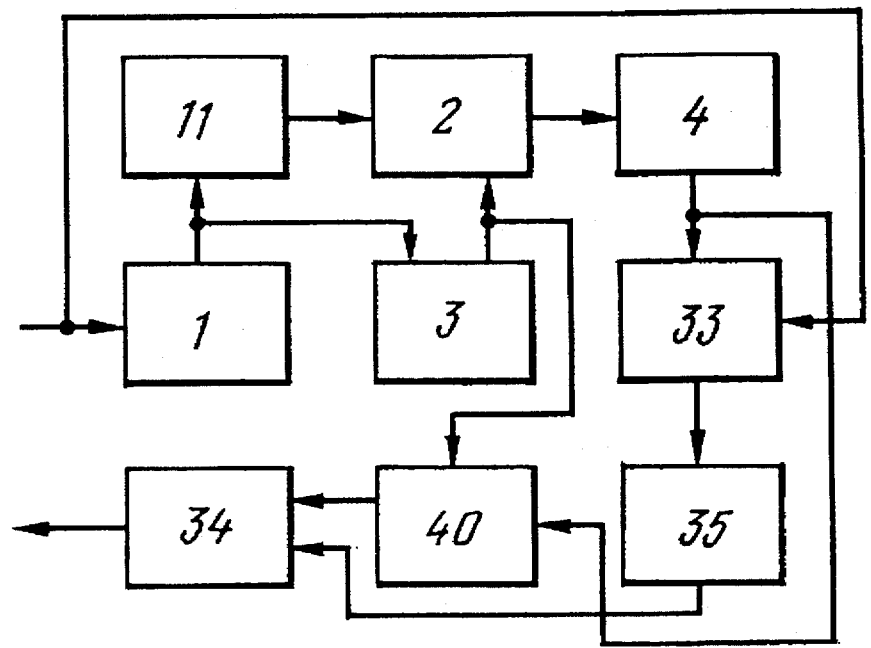
FIG. 11 is a functional block diagram of still another arrangement of the apparatus.
Figure 16:
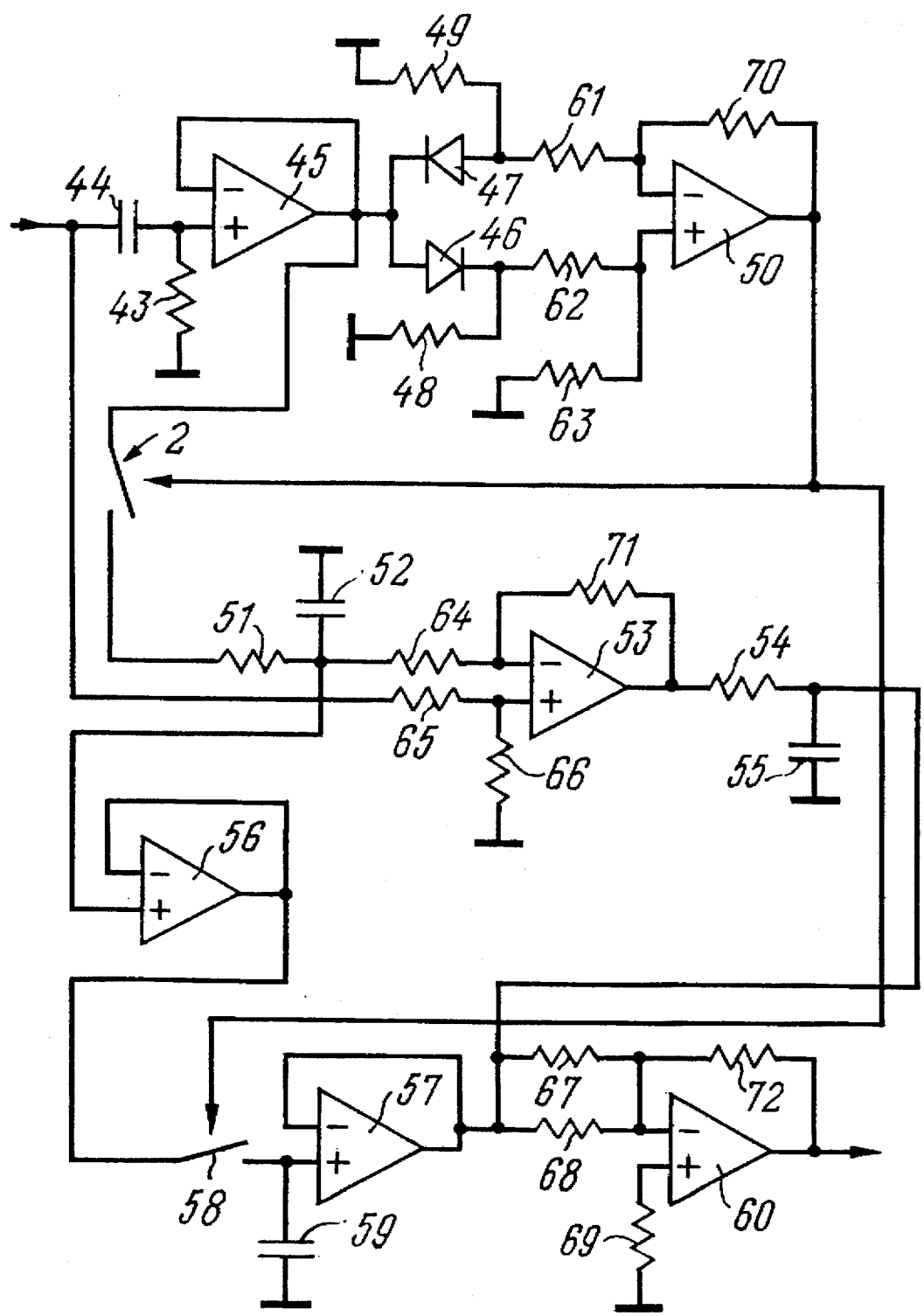
FIG. 16 is a simplified electric schematic diagram of the apparatus.

The apparatus for suppressing interference in a monochrome television video signal represented in FIG. 16 by its simplified electric schematic diagram corresponds to the functional block diagram shown in FIG. 10. The high-pass filter 1 is constructed on the base of a resistor 43 (FIG. 16) and a capacitor 44 each connected to the non-inverting input of an operational amplifier 45 which operates as a follower. The video signal front detector 3 (FIG. 10) is constructed in accordance with a functional block diagram shown in FIG. 2 and comprises the full-wave rectifier 5 on the base of diodes 46 (FIG. 16), 47 and resistors 48, 49 and an adder on the base of an operational amplifier 50, the latter being a limiting amplifier, i.e. the squaring circuit 6 (FIG. 2). The output of the follower on the base of the operational amplifier 45 (FIG. 16) is connected to the low-pass filter 4 (FIG. 10) having a resistor 51 and a capacitor 52, through the electronic switch 2 (FIG. 10) connected at its control input to the operational amplifier 50 (FIG. 16). Constructed on the base of an operational amplifier 53 is the adder 33 (FIG. 10), also referred to as a differential amplifier, having its input connected to the output of the low-pass filter 4 and to the input of the apparatus of the invention. The low-pass filter 35 connected to the output of the adder 33, is constructed on the base of a resistor 54 (FIG. 16) and a capacitor 55. The analog storage 40 (FIG. 10), also referred to as sample-and-hold unit, comprises two followers constructed on the base of operational amplifiers 56 (FIG. 16), 57 with an electronic switch 58 and a capacitor 59 connected therebetween. The adder 34 (FIG. 10) having its inputs connected to the analog storage 40 and the low-pass filter 34 is constructed on the base of an operational amplifier 60. In FIG. 16 there are shown also input resistors 61, 62, 63, 64, 65, 66, 67, 68, 69 and feedback resistors 70, 71, 72 of the operational amplifiers 50, 53, 60.

There may be other modes for carrying out the invention which are characterized by another realization of the units included therein, such realization being not only analog-based (for clarity illustrated by appended signal diagrams), but also digital/analog-based and digital-based, as well as by another circuitry using discrete components, integrated microcircuits, microprocessors, LSI, etc. It should be also noted that the functional block diagrams discussed above are shown in simplified form and, in practice, may include additional units which provide for level, polarity, time and frequency band matching as well as for optimization of parameters thereof.

It should be particularly noted that although those embodiments of the invention for color television have been described above which correspond to only two embodiments of the invention for monochrome television, there may be other embodiments for color television corresponding to all the embodiments for monochrome television described above. Furthermore, in the color television embodiments, three or (for example, for applied television) two channels of the apparatus of the invention need not be necessarily identical, i.e. different channels thereof may correcpond to different arrangements of the apparatus for monochrome television.

The apparatus for suppressing interference in a monochrome television video signal shown in FIG. 1 operates as follows.

Figure 17:
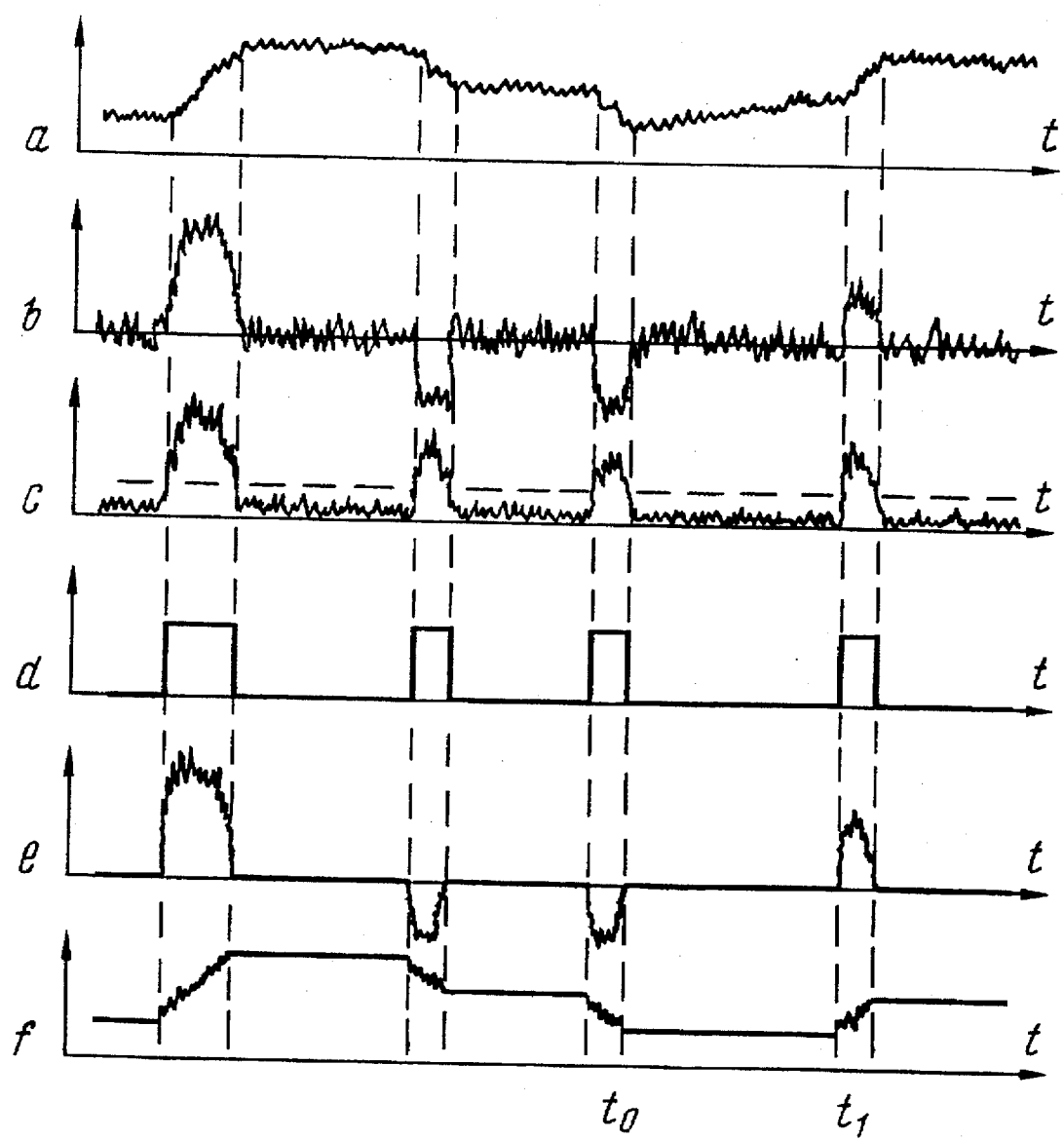
FIG. 17a, b, c, d, e, f are timing diagrams illustrating the operation of the apparatus shown in FIGS. 1, 2 and 3.

An input video signal (FIG. 17a) in the high-pass filter 1 (preferably of an odd order) is converted in such a way that the fronts of the input video signal correspond to the pulses of an output signal (FIG. 17b). These pulses, affected by high-frequency interference (for clarity, these pulses are shown in FIG. 17 and in subsequent Figures as having a higher level of high-frequency interference than that which is encountered in practice), are shaped in the detector 3 into interference free rectangular pulses (FIG. 17d) which are used for controlling the electronic switch 2. In response to the input rectangular pulses, the electronic switch 2 derives at its output (FIG. 17e) a signal only when the input video signal has the fronts of relatively high in magnitude and duration video pulses which correspond to the edges of relatively large elements in a transmitted television picture. In the low-pass filter 4 whose frequency characteristic is, with a cirtain reasonable approximation, reverse to that of the high-pass filter 1, the fronts of the initial video signal are regenerated (FIG. 17f). In this case, the portions of the input video signal (FIG. 17a) between its fronts at the output (FIG. 17f) turn to be completely free of high-frequency and medium-frequency interference. However, this processing causes suppression of low-frequency interference in the output video signal as well, for example, over the interval $t_0t_1$ in FIG. 17f. This can be disregarded when transmitting textual, graphical or any other official information. Transmitting pictures of other types, however, needs additional measures.

The output rectangular pulses (FIG. 17d) are derived by the video signal front detector 3 as a result of rectifying (FIG. 17c) the input signal (FIG. 17b) by means of the full-wave rectifier 5 and of converting by means of the squring circuit 6.

When converting the input video signal (FIG. 17b) into the output rectangular pulses (FIG. 17d) by means of the video signal front detector 3, the noise level in the initial video signal (FIG. 17a) is taken into account. The squaring circuit 10 controls the relative position of a threshold and a signal to avoid strengthening of influence of high magnitude impulse interference by increasing the steepness of their fronts. To this end, a signal (FIG. 17c) at the output of the full-wave rectifier 7 is subsequently flattened in the low-pass filter 8 and subtracted from a signal at the input of the low-pass filter 8 by means of the adder 9 which effects an algebraic summation of addends having opposite signs. Therefore, for example, when an increase in a noise level occurs, the squaring circuit 10 responds to the pulses of relatively high magnitude at the output of the high-pass filter 1.

Where the apparatus of the invention is equipped with the delay unit 11, more accurate protection against misoperation of the video signal front detector 3 due to high magnitude impulse interference is effected by introducing a time delay into a signal applied to the signal input of the electronic switch 2 (FIG. 18c).

Figure 18:
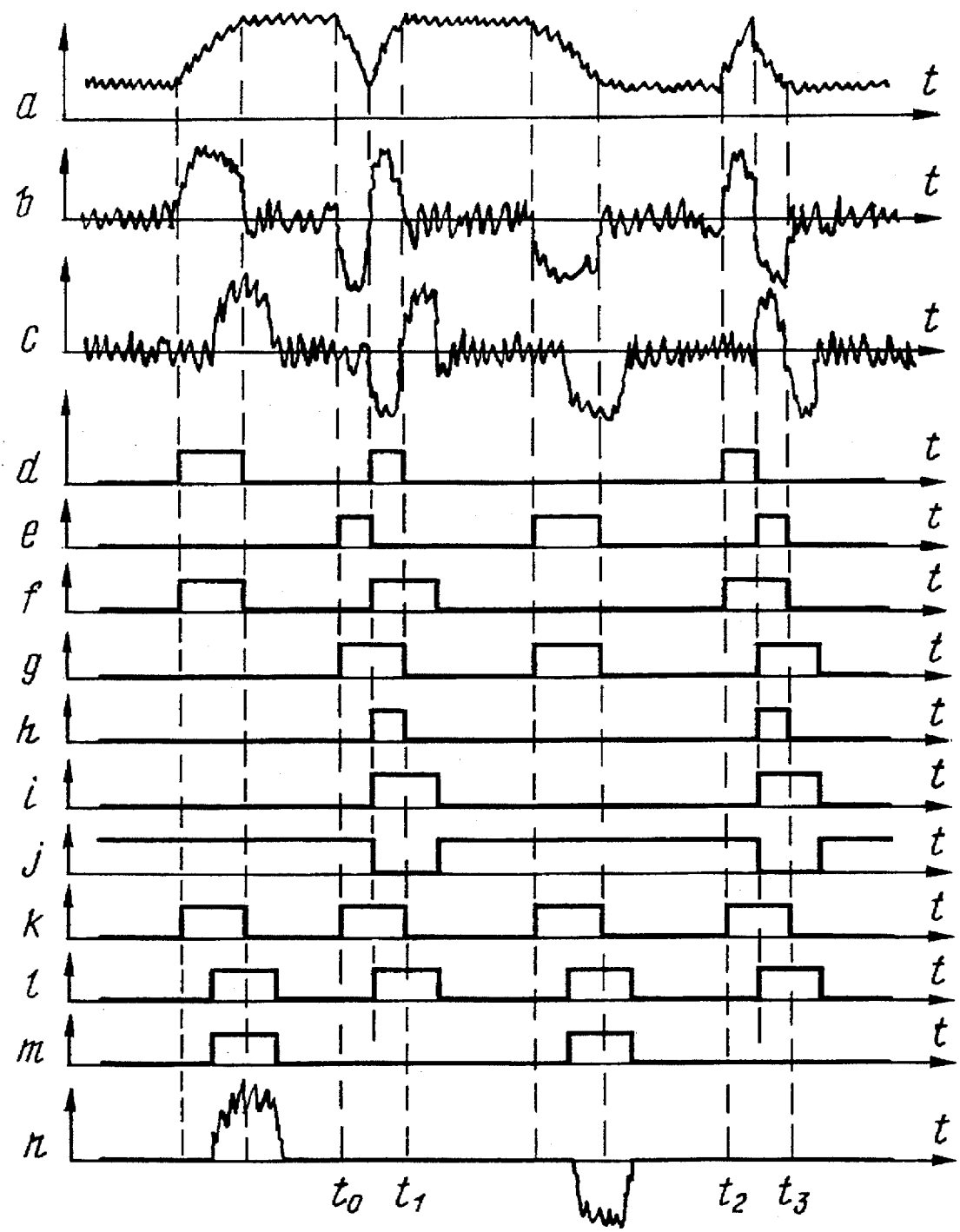
FIG. 18a, b, c, d, e, f, g, h, i, j, k, l, m, n are timing diagrams illustrating the operation of the apparatus shown in FIGS. 4 and 5.

In the detector 3 shown in FIG. 5, this protection is effected substantially by way of time selection of input video pulses (FIG. 18a). In other words, the high magnitude input video pulses are considered to be impulse interference, for example, over the intervals $t_0t_1$ and $t_2t_3$ of FIG. 18, if their duration does not exceed a cirtain value, e.g. 100 ns. If duration of the input video pulses exceeds this value, they are considered to be video signals corresponding to the transmitted picture. As can be seen, corresponding to these fast input video pulses (FIG. 18a) is the pair of twice as fast bipolar pulses at the output (FIG. 18b) of the high-pass filter 1. On the basis of these bipolar pulses, the squaring circuits 12 form rectangular pulses (FIG. 18d, e) having duration which is equal to that of the bipolar pulses. The front edges of these pulses trigger the monostable multivibrators 13 which, in their turn, form rectangular pulses (FIG. 18f, g) of fixed duration equal to minimal predetermined duration of the input video pulses, e.g. of 100 ns. Therefore, where there is an interference at the input of the high-pass filter 1 (in FIG. 18b, the time intervals $t_0t_1$ and $t_2t_3$), the AND circuit 15 generates at its output a pulse which is converted by the monostable multivibrator 17 into a rectangular pulse of fixed duration (for example, of 100 ns). At the output of the monostable multivibrator 17, this pulse is inverted by the NOT circuit 18 and, being applied to the input of the AND circuit 19, prevents occurance at the output thereof of the pulses which control the electronic switch 2. If the duration of the input video pulses is sufficiently high, the pulses at the output of the high-pass filter 1, corresponding to the fronts of the video pulses at the input thereof, appear to be spaced from each other at sufficient time intervals. Therefore, during these time intervals, no pulse occurs at the output of the AND circuit 15. As a result, the AND circuit 19 generates at its output a rectangular pulse (FIG. 18m) formed (FIG. 18k) by the OR circuit 16 and delaid (FIG. 18l) by the delay unit 20.

Figure 6:
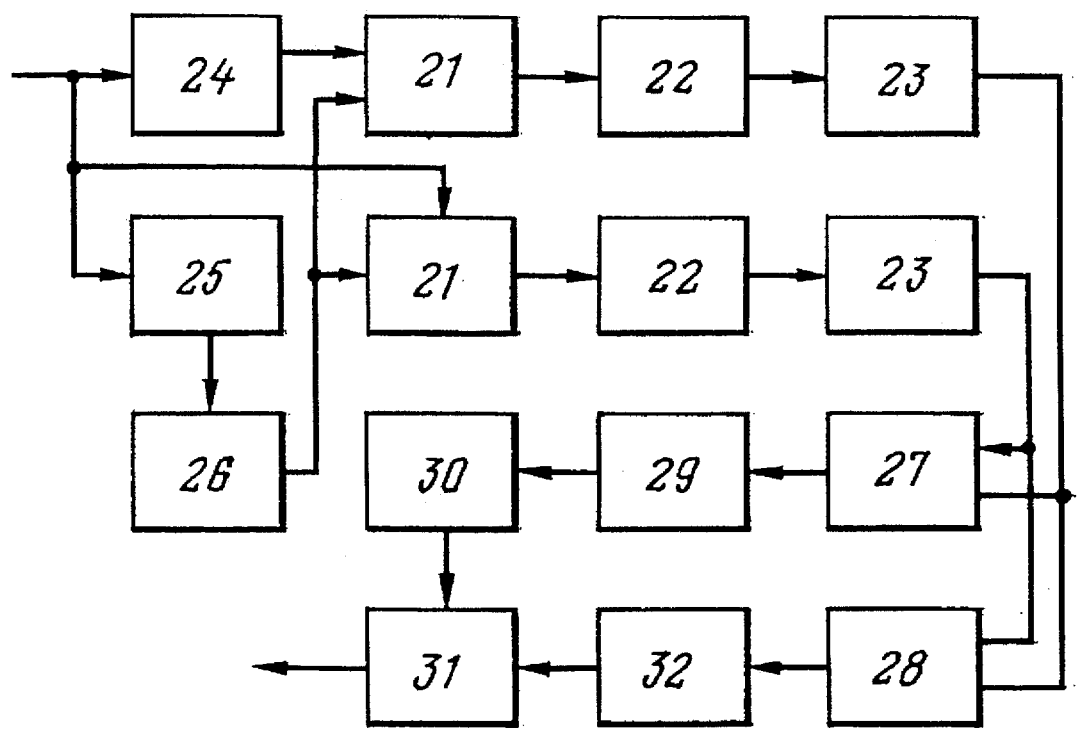
FIG. 6 is still another functional block diagram of the video signal front detector.

The detector 3 represented in FIG. 6 by its functional block diagram operates in the same manner as the previous arrangement thereof. To enhence noise protection, the tracing of the operation threshold in the squaring circuits 22 is provided. To this end, the squaring circuits 22 are provided with the adders 21 (likewise in FIG. 3). A signal at the output of the adders 21 is biased by voltage rectified by the full-wave rectifier 25 and smoothed by the low-pass filter 26 and then supplied to the additional inputs of the adders 21 to thereby provide a threshold self-adjustment in the squaring circuits 22.

Figure 19:
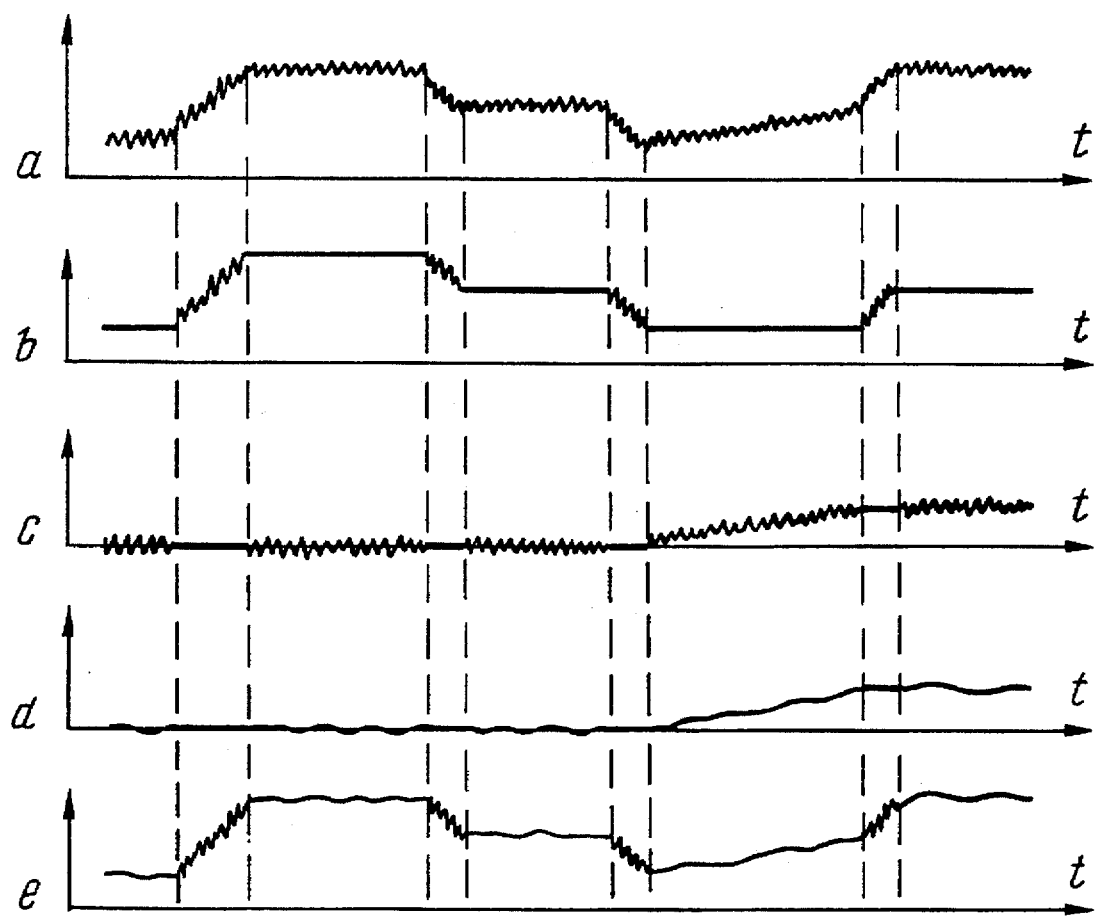
FIG. 19a, b, c, d, e are timing diagrams showing the operation of the apparatus of FIG. 7.

In the apparatus shown as a functional block diagram in FIG. 7, in contrast with those of FIGS. 1 and 4, a non-distored reproduction of low-frequency components in a video signal is provided. This is achieved in the following manner. An input video signal (FIG. 19a) is cleared from the high-frequency and medium-frequency interference (FIG. 19b) in a manner similar to that described above. The input video signal and the noise-free video signal are then subjected to algebraic summation (i.e. with regard for opposite signs of addends) by means of the adder 33. Their difference (FIG. 19c) thus includes only the low-frequency component of the video signal as well as high-frequency and medium-frequency interference, the latter practically being completely suppressed (FIG. 19d) by the low-pass filter 35. Further, after summation of the low-frequency component (FIG. 19d) of the video signal and the high-frequency component (FIG. 19b) thereof in the adder 34, the video signal, being substantially free of high-frequency and medium-frequency interference, is completely regenerated.

In the apparatus shown in FIG. 8, an additional protection against high magnitude impulse interference is achieved in a manner described above by providing the delay unit 11 and an appropriate circuitry of the detector 3.

Figure 9:
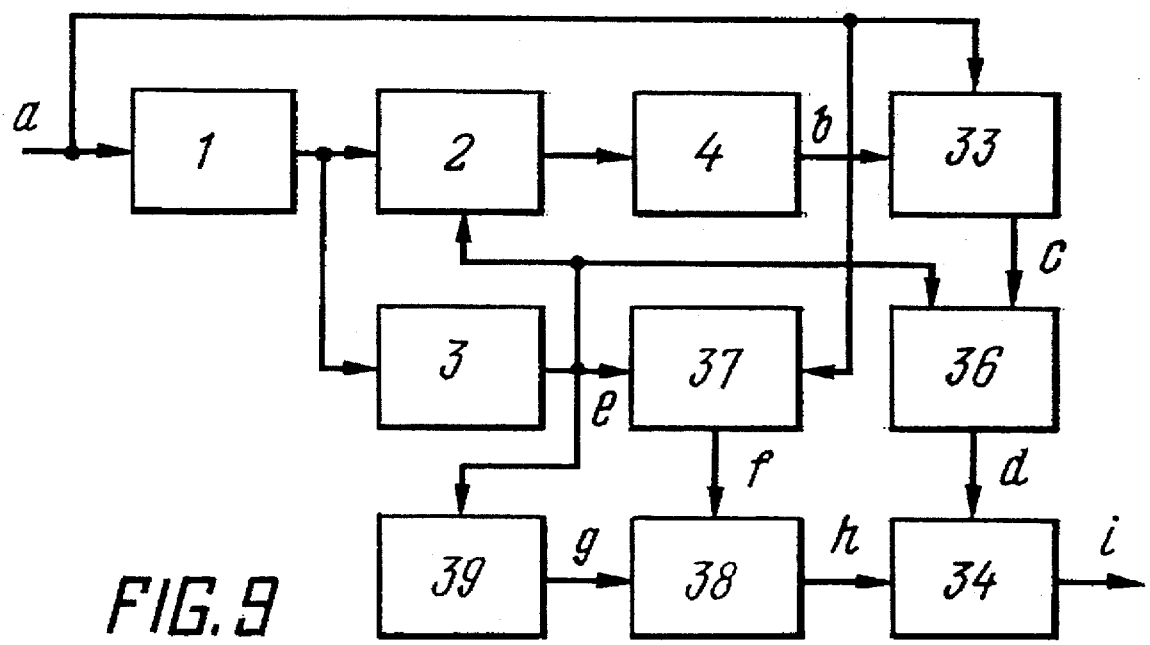
FIG. 9 is the same apparatus for suppressing interference in a monochrome television video signal which provides for an increase in a video signal front steepness.

The apparatus represented in FIG. 9 by its functional block diagram includes a circuit for increasing sharpness of the corresponding television pictures to increase, in addition to noise suppression, the steepness of video signal fronts.

Figure 20:
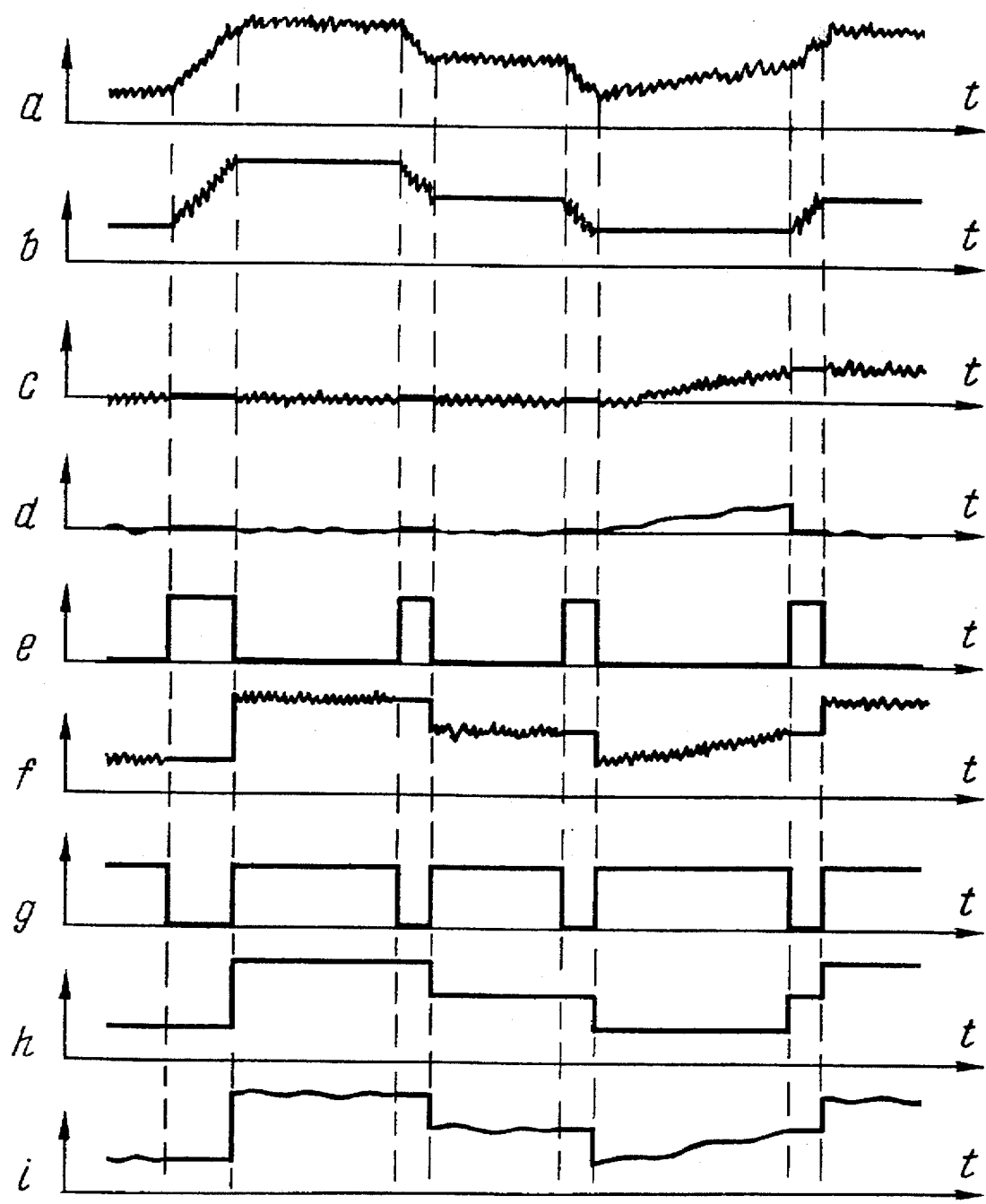
FIG. 20a, b, c, d, e, f, g, h, i are timing diagrams illustrating the operation of the apparatus shown in FIG. 9.

This apparatus operates in the following manner. As it has been already described above, an input video signal (FIG. 20a) is converted into a signal (FIG. 20b) which is free of high-frequency and medium-frequency interference, while the adder 33 generates their difference (FIG. 20c). This difference is cleared from high-frequency and medium-frequency interference in the integrating circuit 36 and, upon the influence of rectangular pulses (FIG. 20e) formed by the detector 3, is reduced to zero (FIG. 20d). The same rectangular pulses formed by the detector 3 switch the analog storage 37 to the storage mode (FIG. 20g) and analog storage 38 to the tracing mode (FIG. 20h). During time intervals, when these control rectangular pulses are not being formed by the detector 3, the analog storage 37 is in its tracing mode (FIG. 20g), while the analog storage 38 is in its storage mode (FIG. 20h). As a result, the analog storage produces at its output a completely noise-free video signal (FIG. 20h) which, upon summation with the video signal low-frequency component (FIG. 20d), permits regeneration of the initial video signal (FIG. 20i) having steep fronts, while being practically noise-free.

Figure 21:
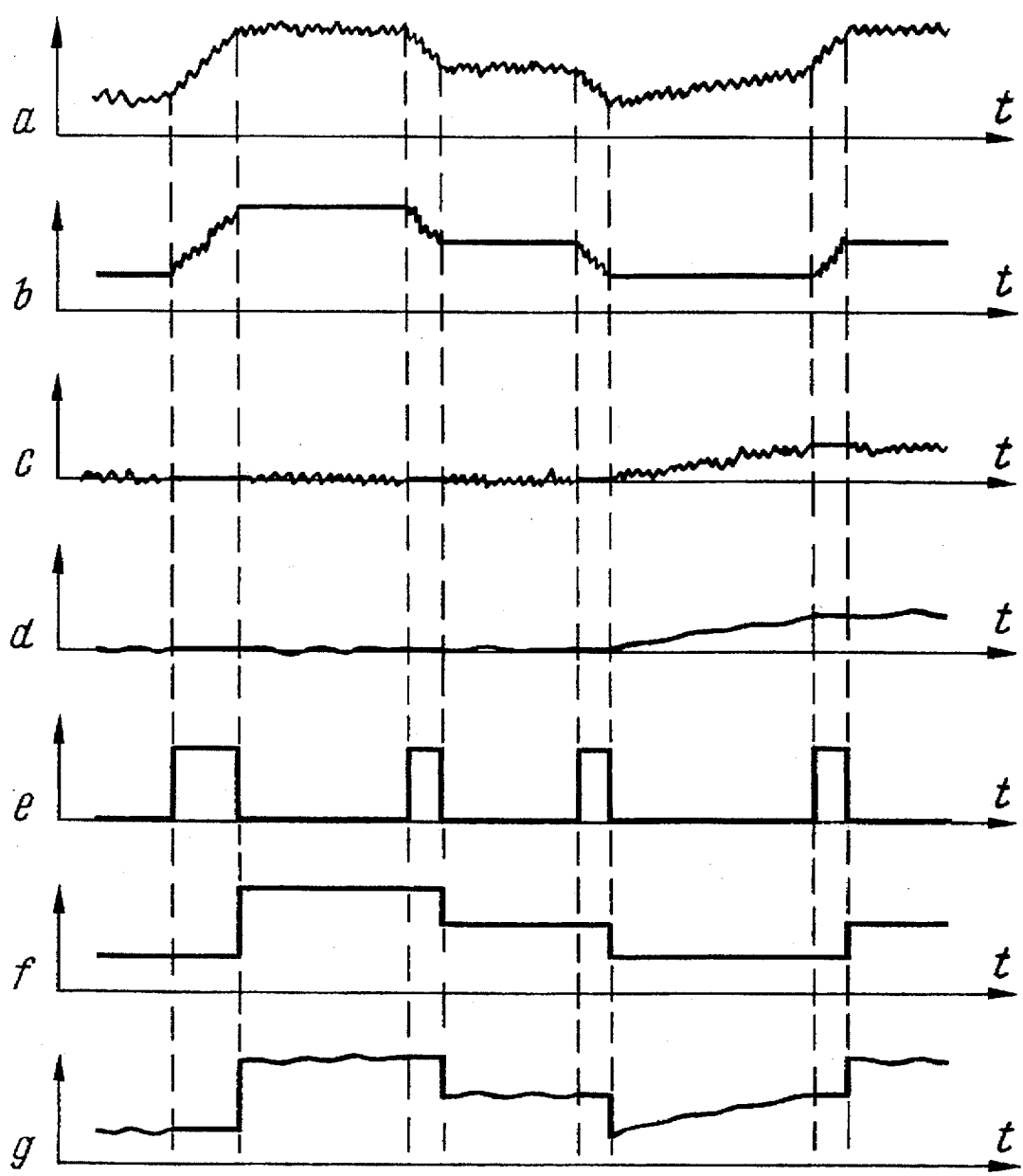
FIG. 21a, b, c, d, e, f, g are timing diagrams illustrating the operation of the apparatus shown in FIG. 10.

The apparatus shown in FIG. 10 operates in a similar manner as described above, an input video signal (FIG. 21a), however, being cleared from high-frequency and medium-frequency interference (FIG. 21b), while the low-frequency component of the video signal (FIG. 21c) being derived at the output of the adder 33 and then cleared from high-frequency and medium-frequency interference (FIG. 21d) by means of the low-pass filter 35. The steepness of video pulse fronts (FIG. 21f) in the analog storage 40 is increased under influence of the rectangular pulses (FIG. 21e) formed by the detector 3. Finally, the adder 34 regenerates the initial video signal having steep fronts and being noise-free.

In the apparatus comprising the signal delay unit 11 and an appropriate arrangement of the video signal front detector 3, aforementioned additional protection against high level impulse interference is provided in a manner described above.

Figure 13:
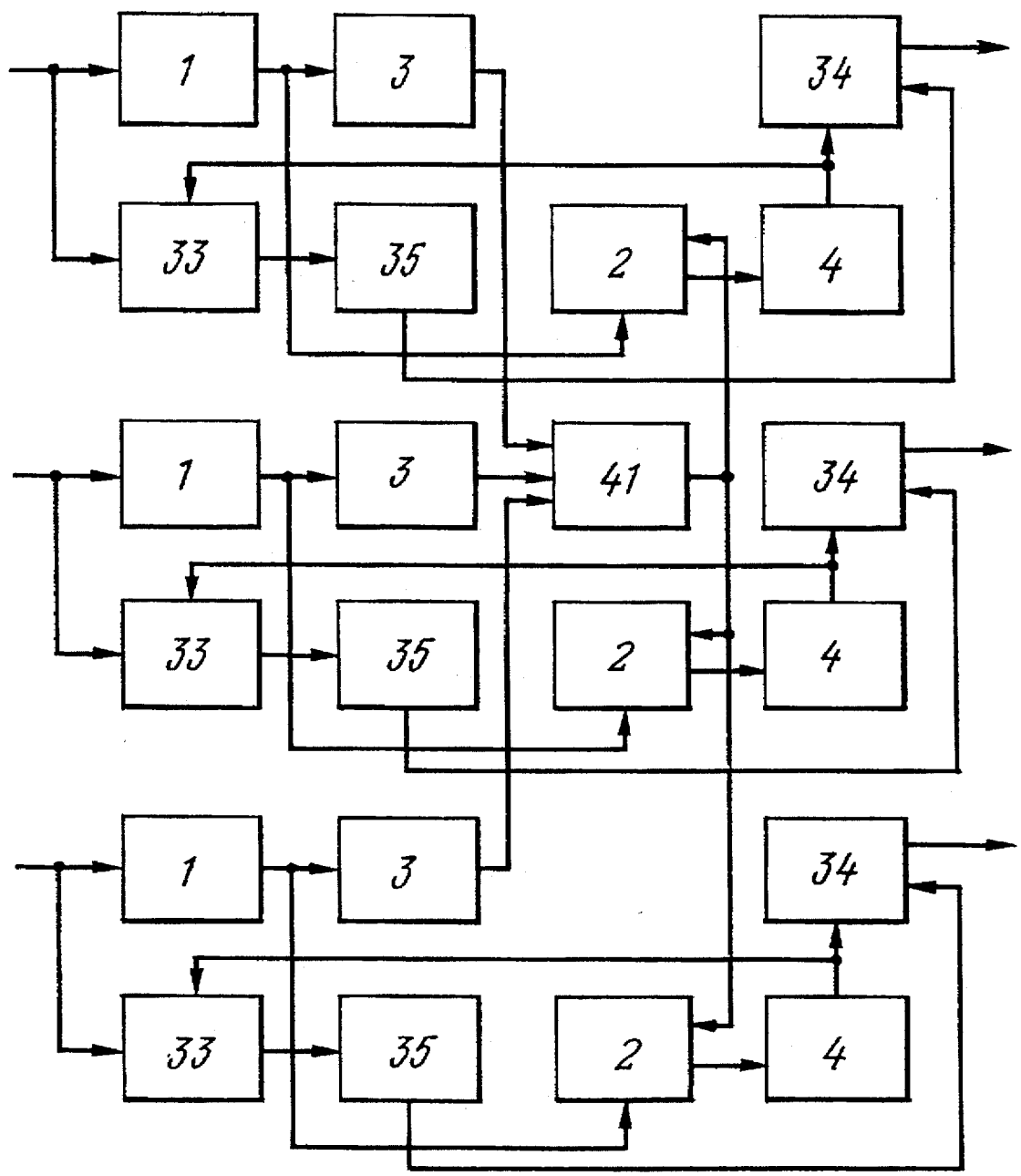
FIG. 13 is another functional block diagram of an arrangement of the apparatus for color television.

The apparatus for suppressing interference in a color television video signal shown as a functional block diagram in FIG. 13 comprises three, according to the number of video signals, identical parallel channels, each being constructed and operating in a manner described above with reference to the monochrome form shown in FIG. 7. It is to be understood that three input video signals can be either green, red and blue video signals or luminance and color-difference video signals.

To reproduce a low-frequency component in the regenerated video signals with a higher accuracy, common rectangular pulses to control all electronic switches 2 are derived at the output of the circuit 41. Thus, in the described apparatus there is no condition where the detector 3 either does not shape a rectangular control pulse in a relatively narrower-band (for example, color-difference) video signal channel due to low steepness of the input video signal fronts and/or to high-level interference, or it does shape such a pulse which is, however, somewhat different from that in a relatively broader-band (for example, luminance) video signal channel.

It is possible to reproduce input video signal low-frequency components in the regenerated video signals with a higher accuracy as well as to prevent distortions in color reproduction of sharp edges of the corresponding television pictures. This is achieved by rectangular pulses common for all the electronic switches 2 and analog storages 40, which pulses are derived at the output of the OR circuit 42 (FIG. 15). Therefore, in the described arrangement, there is no condition where the detectors 3 in corresponding channels either do not shape control rectangular pulses due to low steepness of the fronts of relatively narrower-band signals and/or to high-level interference, or they do shape such pulses which are, however, somewhat different (as to their duration and/or time position) from those in a channel of a relatively broader-band video signal.

Thus, the apparatus for suppressing interference in television video signals according to the invention provides, in the end, a significant increase in the quality of television pictures by lowering a noise level in them, in addition to the existing one, down to 20 dB as well as by increasing their sharpness up to the level not less than 600–700 equivalent lines of picture decomposition. This improvement in television picture quality within a definite range of changing parameters in direct video signals is guaranteed and stable for any specific hardware mode for carrying out the present invention.

INDUSTRIAL APPLICABILITY

The present invention may be used both in monochrome television and color television as well as in television broadcasting and in applied television systems for regeneration of a television video signal, i.e. for clearing video signals from interference and for regenerating high steepness of their fronts, including multiregeneration. More particularly, the present invention may be used in television broadcasting receivers and applied television system monitors, in active retransmitters, in television cameras, in video tape recorders and other video recording devices. In the the latter case, the present invention may be advantageously used both at the input of such a device, i.e. before recording, and at the output of such a device, i.e. after a playback.

I claim:

1. An apparatus for suppressing interference in a television video signal comprising an electronic switch (2), a signal output of the electronic switch (2) being connected to a signal input of a first low-pass filter (4), characterized in that it further comprises a high-pass filter (1) having an input fed with a video signal, and an output connected to a first signal input of the electronic switch (2), and a video signal front detector (3) having an input connected to the output of the high-pass filter (1), and an output connected to a second signal input of the electronic switch (2).

2. The apparatus according to claim 1, characterized in that the video signal detector (3) comprises a full-wave rectifier (5) connected in series with a squaring circuit (6).

3. The apparatus according to claim 1, characterized in that the video signal front detector (3) comprises a full-wave rectifier (7), a low-pass filter (8) having an input connected to the output of the full-wave rectifier (7), an adder (9) having inputs connected to the outputs of the full-wave rectifier (7) and the low-pass filter (8), and a squaring circuit (10) having an input connected to the output of the adder (9), while the output thereof is being the output of the video signal front detector (3).

4. The apparatus according to claim 1, characterized in that it further comprises a signal delay unit (11) having an input connected to the output of the high-pass filter (1), while the output thereof is connected to the first signal input of the electronic switch (2).

5. The apparatus according to claim 4, characterized in that the video signal front detector (3) includes two signal shaping channels having a common input which is the input of the video signal front detector (3), each channel comprising a squaring circuit (12) in series with a monostable multivibrator (13), one of said channels also comprising an inverter (14) connected to the input of the squaring circuit (12), the outputs of the monostable multivibrators (13) of the two channels being connected to the inputs of an AND circuit (15) and an OR circuit (16), the output of the AND circuit (15) being connected to the input of another monostable multivibrator (17) having its output connected to the input of a NOT circuit (18), the output of the OR circuit (16) being connected to the input of a second signal delay unit (20) having its output connected to one input of a second AND circuit (19), the second AND circuit (19) having the other input connected to the output of the NOT circuit (18), and the output of the AND circuit (19) being the output of the video signal front detector (3).

6. The apparatus according to claim 4, characterized in that the video signal front detector (3) includes two signal shaping channels, each channel comprising an adder (21), a squaring circuit (22), and a monostable multivibrator (23), series connected together, one of said channels also comprising an inverter (24) connected to a first input of the adder (21), the second inputs of the adders (21) of the two channels being series connected to a full-wave rectifier (25) and a low-pass filter (26), the inputs of both channels being combined and connected to the input of the full-wave rectifier (25), the outputs of the monostable multivibrators (23) of the two channels being connected to the inputs of an AND circuit (27) and an OR circuit (28), the output of the AND circuit (27) being connected to the input of a further monostable multivibrator (29) wherein the multivibrator (29) has its output connected to the input of a NOT circuit (30), the output of the OR circuit (28) being connected to the input of a second delay unit (32) wherein the second delay unit (32) has its output connected to one input of a second AND circuit (31) wherein the second AND circuit (31) has its other input connected to the output of the NOT circuit (30), and the output of the AND circuit (31) is the output of the video signal front detector (3).

7. The apparatus according to claim 1, characterized in that it further comprises a first adder (33) having one input fed with the video signal and the other input connected to the output of the first low-pass-filter (4), a second low-pass filter (35) having its input connected to the output of the first adder (33), and a second adder (34), the inputs thereof being connected to the outputs of the first low-pass filter (4) and the second low-pass filter (35), while the output thereof is the output of the entire apparatus.

8. The apparatus according to claim 4, characterized in that it comprises a first adder (33) having one input fed with the video signal and the other input connected to the output of the first low-pass filter (4), a second low-pass filter (35) having its input connected to the output of the first adder (33), and a second adder (34), the inputs thereof being connected to the outputs of the first and second low-pass filters (4, 35), while the output thereof is the output of the entire apparatus.

9. The apparatus according to claim 1, characterized in that it comprises a first adder (33), having one input fed with the video signal and the other input connected to the output of the first low-pass filter (4), a first analog storage (37), having its signal input fed with the video signal and its control input connected to the output of the video signal front detector (3), a NOT circuit (39) having its input connected to the output of the video signal front detector (3), an integrating circuit (36) having its signal input connected to the output of the first adder (33) and its zero adjustment input connected to the output of the video signal front detector (3), and a second analog storage (38) having its signal input connected to the output of the first analog storage (37), its control input connected to the output Of the NOT circuit (39) and its output connected to one input of a second adder (34), the other input thereof being connected to the output of the integrating circuit (36), while the output of the second adder (34) is the output of the entire apparatus.

10. The apparatus according to claim 1, characterized in that it comprises a first adder (33) having one input fed with the video signal and the other input connected to the output of the first low-pass filter (4), an analog storage (40) having its signal input connected to the output of the first low-pass filter (4) and its control input connected to the output of the video signal front detector (3), a second low-pass filter (35) having its input connected to the output of the first adder (33), and a second adder (34) having its inputs connected to the outputs of the second low-pass filter (35) and the analog storage (40), while the output thereof is the output of the entire apparatus.

11. The apparatus according to claim 4, characterized in that it comprises a first adder (33) having one input fed with the video signal and the other input connected to the output of the first low-pass filter (4), an analog storage (40) having its signal input connected to the output of the first low-pass filter (4) and its control input connected to the output of the video signal front detector (3), a second low-pass filter (35) having its input connected to the output of the first adder (33), and a second adder (34) having its inputs connected to the outputs of the second low-pass filter (35) and the analog storage (40), while the output thereof is the output of the entire apparatus.

12. The apparatus according to claim 1 for suppressing interference in color television video signals, characterized in that there is a separate apparatus for suppressing interference in a television video signal used for each corresponding color television video signal, the outputs of all the corresponding video signal front detectors (3) being connected to the inputs of an OR circuit (41) having its output connected to the control inputs of all the electronic switches (2).

13. The apparatus according to claim 12, characterized in that the output of an OR circuit (42) is connected to the control inputs of analog storages (40) of each apparatus for suppressing interference in the television video signal.

* * * * *